United States Patent
Yamamoto et al.

(10) Patent No.: US 9,008,968 B2
(45) Date of Patent: Apr. 14, 2015

(54) GUIDANCE INFORMATION GENERATING DEVICE, GUIDANCE INFORMATION GENERATING METHOD AND GUIDANCE INFORMATION GENERATING PROGRAM

(75) Inventors: Toshiki Yamamoto, Anjo (JP); Hiroaki Sugiura, Okazaki (JP); Kenji Nagase, Okazaki (JP); Kuniaki Tanaka, Toyota (JP); Tomoki Kodan, Beijing (CN); Akira Saito, Toyota (JP)

(73) Assignees: Aisin AW Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/125,389

(22) PCT Filed: May 23, 2012

(86) PCT No.: PCT/JP2012/003363
§ 371 (c)(1),
(2), (4) Date: Mar. 11, 2014

(87) PCT Pub. No.: WO2012/172732
PCT Pub. Date: Dec. 20, 2012

(65) Prior Publication Data
US 2014/0195156 A1 Jul. 10, 2014

(30) Foreign Application Priority Data
Jun. 15, 2011 (JP) ................. 2011-133015

(51) Int. Cl.
*G01C 21/00* (2006.01)
*G01C 21/36* (2006.01)

(52) U.S. Cl.
CPC ........ *G01C 21/3626* (2013.01); *G01C 21/3605* (2013.01); *G01C 21/3685* (2013.01)

(58) Field of Classification Search
None
See application file for complete search history.

(56) References Cited

U.S. PATENT DOCUMENTS 6,144,318 A * 11/2000 Hayashi et al. .......... 340/995.19
6,826,472 B1    11/2004 Kamei
(Continued)

FOREIGN PATENT DOCUMENTS

JP    A-2009-175775    8/2009
JP    A 2010-256163    11/2010
(Continued)

OTHER PUBLICATIONS

International Search Report for PCT/JP2012/003363, dated Aug. 28, 2012.

(Continued)

*Primary Examiner* — Jonathan M Dager
(74) *Attorney, Agent, or Firm* — Oliff PLC

(57) ABSTRACT

Search criterion information, which indicates a search criterion is transmitted to a search server, destination point information on a destination point, which is a point found by the search server based on the search criterion, is obtained, a candidate point database that stores candidate point information on a candidate point connected to a road in association with the candidate point is searched, the candidate point associated with the candidate point information having a similarity to the destination point information, higher than or equal to a predetermined reference similarity, is identified as an arrival point, and first guidance information that indicates a first route to the arrival point is generated when the arrival point has been identified and second guidance information that indicates a second route to a point closest to the destination point among points on roads is generated when the arrival point has not been identified.

6 Claims, 4 Drawing Sheets

(56) References Cited

U.S. PATENT DOCUMENTS

| | | | |
|---|---|---|---|
| 7,516,010 B1* | 4/2009 | Kaplan et al. | 701/426 |
| 7,538,690 B1* | 5/2009 | Kaplan et al. | 340/932.2 |
| 8,306,734 B2* | 11/2012 | Mathews | 701/408 |
| 8,589,065 B2* | 11/2013 | Scofield et al. | 701/400 |
| 8,847,791 B1* | 9/2014 | Urbach | 340/932.2 |
| 2004/0158389 A1* | 8/2004 | Shibata et al. | 701/200 |
| 2005/0021227 A1* | 1/2005 | Matsumoto et al. | 701/207 |
| 2005/0182561 A1* | 8/2005 | Yamada et al. | 701/209 |
| 2006/0250278 A1* | 11/2006 | Tillotson et al. | 340/932.2 |
| 2008/0033640 A1* | 2/2008 | Amano | 701/209 |
| 2009/0177383 A1* | 7/2009 | Tertoolen | 701/208 |
| 2011/0257883 A1* | 10/2011 | Kuznetsov | 701/209 |
| 2011/0288762 A1* | 11/2011 | Kuznetsov | 701/200 |
| 2014/0249742 A1* | 9/2014 | Krivacic et al. | 701/400 |

FOREIGN PATENT DOCUMENTS

| | | |
|---|---|---|
| WO | WO 2006/020088 A1 | 2/2006 |
| WO | 2011/013177 A1 | 2/2011 |

OTHER PUBLICATIONS

Written Opinion for PCT/JP2012/003363, dated Aug. 28, 2012.
International Preliminary Report on Patentability for PCT/JP2012/003363, dated Sep. 9, 2013.
International Preliminary Report on Patentability for PCT/JP2012/003363, dated Sep. 26, 2013.

* cited by examiner

GUIDANCE INFORMATION GENERATING DEVICE, GUIDANCE INFORMATION GENERATING METHOD AND GUIDANCE INFORMATION GENERATING PROGRAM

TECHNICAL FIELD

The present invention relates to a guidance information generating device, a guidance information generating method and a guidance information generating program.

Background Art

There has been suggested a technique for identifying a point (location), to which a navigation system provides guidance, using a result found by a search provider on the Internet. PTL 1 (Japanese Patent Application Publication No. 2010-256163) describes a technique that, when no point that matches a first search keyword entered by a user has been found in a navigation system, a search provider acquires a second search keyword relevant to the first search keyword and then the navigation system searches again for a point that matches the second search keyword. A database that a search provider on the Internet uses for searching stores an enormous amount of data larger than that stored in the database of the navigation system, so even a point that cannot be found solely by the navigation system may be found by utilizing a search provider.

CITATION LIST

Patent Literature

PTL 1: Japanese Patent Application Publication No. 2010-256163 (JP 2010-256163 A)

SUMMARY OF INVENTION

Technical Problem

However, a result found by a search provider may be inappropriate as information utilized by the navigation system. That is, many points that are not connected to roads are also entered in the database of a search provider, so, when guidance to a destination point is provided on the basis of a result found by the search provider, a route to the destination point may not be found or a route to a point that is on a road near the destination point and that is an inappropriate arrival point for a vehicle may be used to provide guidance for the vehicle.

The present invention provides a guidance information generating device, guidance information generating method and guidance information generating program that, even when a point that is not connected to a road has been found as a destination point, provides guidance to an appropriate arrival point in order to reach the destination point.

Solution to Problem

A first aspect of the invention provides a guidance information generating device. The guidance information generating device includes: a search criterion information transmission unit that transmits search criterion information, which indicates a search criterion, to a search server; a destination point information acquisition unit that acquires destination point information on a destination point, which is a point found by the search server on the basis of the search criterion, from the search server; an arrival point identifying unit that searches a candidate point database that stores candidate point information on a candidate point connected to a road in association with the candidate point, and that identifies the candidate point, associated with the candidate point information having a similarity to the destination point information, higher than or equal to a predetermined reference similarity, as an arrival point; and a guidance information generating unit that generates first guidance information that indicates a first route to the arrival point when the arrival point has been identified and that generates second guidance information that indicates a second route to a point closest to the destination point among points on roads when the arrival point has not been identified.

A second aspect of the invention provides a guidance information generating method. The guidance information generating method includes: transmitting search criterion information, which indicates a search criterion, to a search server; acquiring destination point information on a destination point, which is a point found by the search server on the basis of the search criterion, from the search server; searching a candidate point database that stores candidate point information on a candidate point connected to a road in association with the candidate point, and identifying the candidate point, associated with the candidate point information having a similarity to the destination point information, higher than or equal to a predetermined reference similarity, as an arrival point; and generating first guidance information that indicates a first route to the arrival point when the arrival point has been identified and generating second guidance information that indicates a second route to a point closest to the destination point among points on roads when the arrival point has not been identified.

A third aspect of the invention provides guidance information generating program that causes a computer to perform a guidance information generating function. The guidance information generating function includes: transmitting search criterion information, which indicates a search criterion, to a search server; acquiring destination point information on a destination point, which is a point found by the search server on the basis of the search criterion, from the search server; searching a candidate point database that stores candidate point information on a candidate point connected to a road in association with the candidate point, and identifying the candidate point, associated with the candidate point information having a similarity to the destination point information, higher than or equal to a predetermined reference similarity, as an arrival point; and generating first guidance information that indicates a first route to the arrival point when the arrival point has been identified and generating second guidance information that indicates a second route to a point closest to the destination point among points on roads when the arrival point has not been identified.

With the above configurations, when the arrival point, associated with the candidate point information having the similarity to the destination point information on the destination point found by the search server, higher than or equal to the predetermined reference similarity, has been identified, guidance for the first route to the arrival point can be provided. That is, the candidate point connected to a road is identified the an arrival point, so the guidance information generating unit is able to reliably obtain the first route connected to the arrival point and generate the first guidance information that indicates the first route irrespective of whether the destination point is a point connected to a road.

A candidate point of which candidate point information is stored in the point database is a point connected to a road. The road connected to the candidate point may be a roadway on which a vehicle is allowed to run, a cycling way on which a bicycle is allowed to run, a sidewalk on which a pedestrian is allowed to walk or a road that combines any two or more of these. That is, when guidance is provided for a vehicle, it is only necessary to identify an arrival point connected to a roadway such that the vehicle is able to arrive at the arrival point. In addition, when guidance is provided for a pedestrian, it is only necessary to identify an arrival point connected to a sidewalk such that the pedestrian is able to arrive at the arrival point. That is, it is only necessary to identify a point connected to a road, on which a guidance target movable body is allowed to move, as an arrival point. Furthermore, when guidance is provided for a movable body that needs to be parked at an arrival point, such as a vehicle, a point corresponding to a parking facility may be used to provide guidance for the movable body as an arrival point. That is, the candidate point may be a point corresponding to a facility in which a parking space is provided. The candidate point of which the candidate point information is stored in the candidate point database may be a point corresponding to a facility appropriate for a guidance target movable body to arrive at. When the candidate point database that sets a point corresponding to a facility appropriate for a guidance target movable body to arrive at as a candidate point is prepared, it is possible to provide guidance for the first route to the arrival point appropriate for a guidance target movable body to arrive at. On the other hand, when the arrival point has not been identified, the guidance information generating unit generates the second guidance information that indicates the second route to the point closest to the destination point among points on roads. Thus, even when the arrival point has not been identified, it is possible to reduce a situation that guidance for a route cannot be provided.

The candidate point associated with the candidate point information having the similarity to the destination point information on the destination point, higher than or equal to the predetermined reference similarity, may be estimated as not a point that corresponds to a facility independent of a facility corresponding to the destination point but a point corresponding to an attached facility of the facility corresponding to the destination point. This is because the candidate point corresponding to the attached facility of the facility corresponding to the destination point is highly likely to be associated with information having a high similarity to the destination point. In this way, the candidate point corresponding to the facility attached to a facility corresponding to the destination point is identified as the arrival point, so the user is able to initially arrive at the arrival point connected to a road and then go to the destination point corresponding to the facility to which the arrival point is attached. Furthermore, the arrival point is a point connected to a road, so even when the destination point is a point that is not connected to a road, it is possible to reliably arrive at the arrival point and then go to the destination point.

The arrival point identifying unit just needs to identify the candidate point associated with the candidate point information having the similarity to the destination point information, higher than or equal to the predetermined reference similarity, as the arrival point, and is able to identify the arrival point on the basis of a similarity of various pieces of information on the destination point and the candidate point. For example, in a case where the destination point information and the candidate point information each include a plurality of corresponding information items, the arrival point identifying unit may determine that the similarity between the destination point information and the candidate point information is higher than or equal to the predetermined reference similarity when one of the number and the percentage of information items, indicated by the candidate point information, that match the corresponding information items indicated by the destination point information is larger than or equal to a predetermined threshold. Information items indicated by the destination point information and the candidate point information are, for example, the name, address, telephone number, and the like, of the destination point and the candidate point.

The guidance information generating device according to the first aspect may be formed of a single device or may be formed of a plurality of devices. For example, all the units included in the guidance information generating device may be provided in an in-vehicle device, such as a navigation system. Alternatively, all the units included in the guidance information generating device may be provided in a guidance server different from the search server. In the latter case, the first guidance information and the second guidance information are generated in the guidance server, and then these pieces of information are transmitted to the in-vehicle device to thereby make it possible to provide guidance for the first route to the arrival point in the in-vehicle device. Furthermore, the units included in the guidance information generating device may be distributed between the in-vehicle device and the guidance server. For example, the guidance server may identify an arrival point, and the in-vehicle device may generate the first guidance information and the second guidance information.

In addition, the guidance information generating unit may generate the first guidance information that indicates the first route to the arrival point or may generate the first guidance information that indicates the first route and the position of the destination point. In the latter case, the user is able to recognize a positional relationship between the arrival point and the destination point. In addition, by providing guidance for the position of the destination point, the user is able to recognize that guidance for the destination point intended by the user is provided. For example, when only guidance for the first route to the arrival point corresponding to a parking lot attached to a facility corresponding to the destination point is provided, the position of the arrival point may be recognized as the endpoint of the first route; however, there may be the case where the user doubts whether the arrival point is the one for going to the destination point intended by the user. In contrast to this, when guidance for the position of a destination point is also provided, the user is able to recognize that guidance for the first route to the parking lot for going to the destination point intended by the user is provided. In addition, the guidance information generating unit may generate the first guidance information and the second guidance information that provide guidance for the first route and the second route by image, or may generate the first guidance information and the second guidance information that provide guidance for the first route and the second route by voice. Furthermore, the guidance information generating unit may generate the second guidance information that indicates the second route and the position of the destination point.

BRIEF DESCRIPTION OF DRAWINGS

The features, advantages, and technical and industrial significance of this invention will be described below with reference to the accompanying drawings, in which like numerals denote like elements, and wherein.

DESCRIPTION OF EMBODIMENTS

Figure 1:
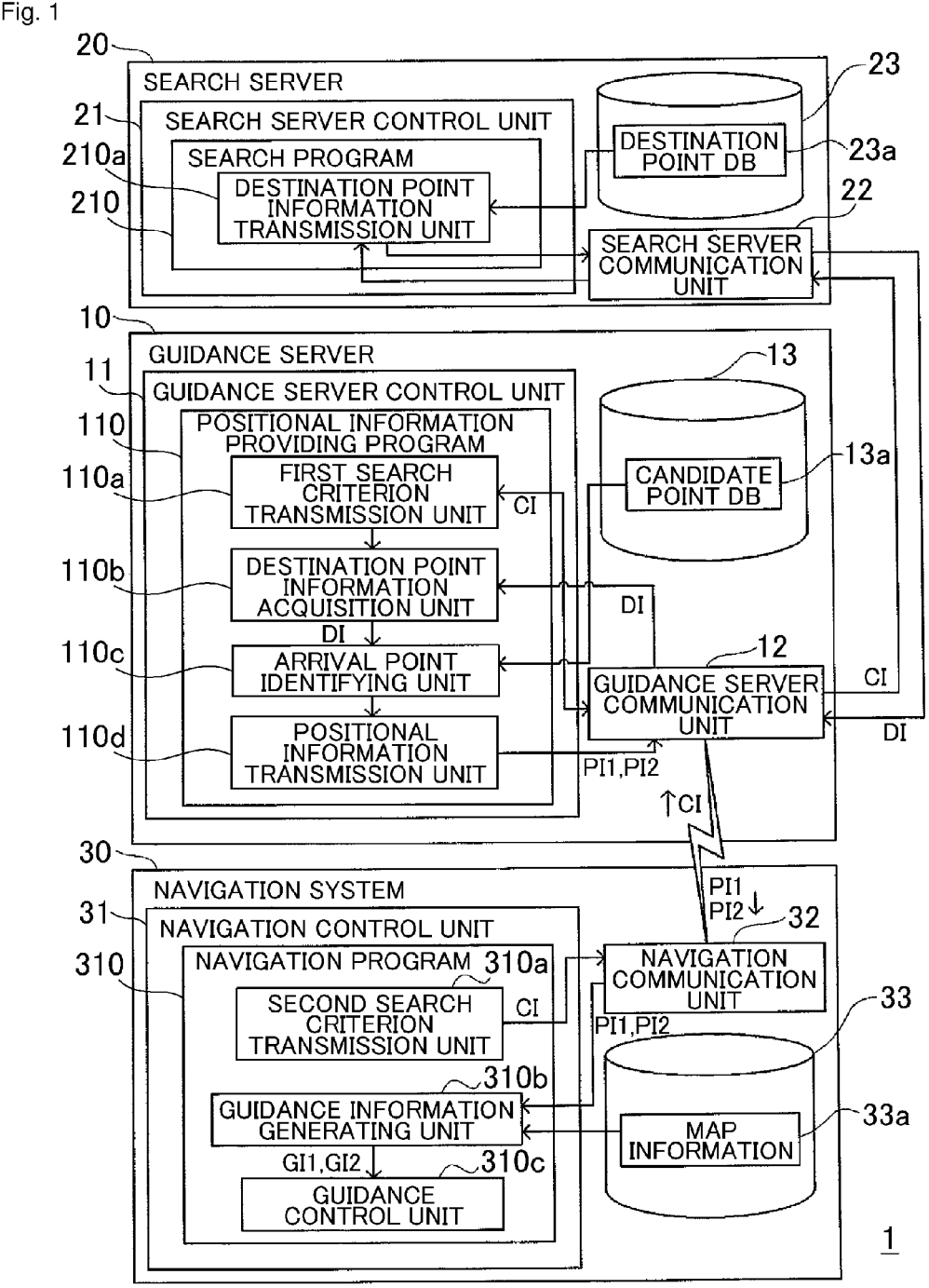
FIG. 1 is a block diagram that shows a destination point guidance system.

Here, an embodiment of the invention will be described in accordance with the following sequence.
(1) Configuration of Destination Point Guidance System
(2) Destination Point Guidance Process
(3) Alternative Embodiments (1) Configuration of Destination Point Guidance System First, the hardware configuration of a destination point guidance system 1 will be described. FIG. 1 is a block diagram that shows the configuration of the destination point guidance system 1 according to the present embodiment. The destination point guidance system 1 includes a guidance server 10, a search server 20 and a navigation system 30. The navigation system 30 is mounted on a vehicle (not shown), and the navigation system 30 and the guidance server 10 bidirectionally communicate with each other. Although not shown in the drawing, the destination point guidance system 1 may include a plurality of pairs of vehicle and navigation system 30. The guidance server 10 and the search server 20 bidirectionally communicate with each other. In the present embodiment, a movable body (transportation) for which guidance is provided is a vehicle.

The guidance server 10 includes a guidance server control unit 11, a guidance server communication unit 12 and a guidance server storage medium 13. The search server 20 includes a search server control unit 21, a search server communication unit 22 and a search server storage medium 23. The navigation system 30 includes a navigation control unit 31, a navigation communication unit 32 and a navigation storage medium 33. Each of the control units 11, 21 and 31 includes a CPU, a ROM and a RAM (not shown), and loads program data stored in the ROM or storage medium 13, 23 or 33 onto the RAM to execute various programs. The guidance server communication unit 12 and the navigation communication unit 32 establish bidirectional communication via a wireless communication unit using, for example, radio waves. Note that the navigation communication unit 32 may be provided for the navigation system 30 or may be formed in another device, such as a cellular phone, that communicates with the navigation system 30. The guidance server communication unit 12 and the search server communication unit 22 establishes bidirectional communication via, for example, the Internet.

Next, the software configuration of the guidance server 10 will be described. As shown in FIG. 1, the guidance server control unit 11 executes a positional information providing program 110. The positional information providing program 110 includes a first search criterion information transmission unit 110a, a destination point information acquisition unit 110b, an arrival point identifying unit 110c and a positional information transmission unit 110d.

The first search criterion information transmission unit 110a is a module for causing the guidance server control unit 11 to execute the function of transmitting search criterion information CI, which indicates a search criterion of a destination point (destination location), to the search server 20. That is, owing to the function of the first search criterion information transmission unit 110a, as the guidance server control unit 11 receives the search criterion information CI from the navigation system 30 as shown in FIG. 1, the guidance server control unit 11 transmits the search criterion information CI to the search server 20. The search criterion of a destination point is a single or multiple search keywords entered into the navigation system 30 by the user.

The destination point information acquisition unit 110b is a module for causing the guidance server control unit 11 to execute the function of acquiring destination point information DI on a destination point (destination location), which is a point (location) found by the search server 20 on the basis of the search criterion, from the search server 20. That is, owing to the function of the destination point information acquisition unit 110b, the guidance server control unit 11 receives the destination point information DI from the search server 20 as a response to the search criterion information CI as shown in FIG. 1. The destination point information DI at least indicates the position, name, address and telephone number of the destination point found by the search server 20 on the basis of the search criterion indicated by the search criterion information CI.

A candidate point database (DB) 13a that stores candidate point information on candidate points (candidate locations) connected to roads, in association with the candidate points, is stored in the guidance server storage medium 13. The arrival point identifying unit 110c is a module for causing the guidance server control unit 11 to execute the function of identifying a candidate point (candidate location) associated with a specific candidate point information within the candidate point DB 13a as an arrival point (arrival location). The specific candidate point information is candidate point information having a similarity to the destination point information DI, higher than or equal to a predetermined reference similarity. The candidate point DB 13a is a database that stores each candidate point connected to a road in association with candidate point information that at least indicates the position, name, address and telephone number of the candidate point. The candidate point of which the candidate point information is stored in the candidate point DB 13a is a point connected to a road on which a vehicle is allowed to run and an appropriate facility at which the vehicle arrives. That is, the candidate point is a point in a facility which a vehicle is allowed to enter from a road outside the facility and in which a parking space is provided. In the present embodiment, a point in a parking lot or a drop-off area, is set as a candidate point, and candidate point information on the candidate point is stored in the candidate point DB 13a.

Owing to the function of the arrival point identifying unit 110c, the guidance server control unit 11 consults the candidate point DB 13a to identify the specific candidate point information, and then identify the candidate point associated with the specific candidate point information as the arrival point. The specific information is identified such that at least one of information items, among the name, address and telephone number, of the specific candidate point matches the corresponding information items of the destination point, indicated by the destination point information DI. That is, at least one of the name, address and telephone number of the arrival point matches the name, address and telephone number of the destination point indicated by the destination point information DI.

The positional information transmission unit 110d is a module for causing the guidance server control unit 11 to execute the function of generating first positional information PI1 that indicates the position of the destination point and the position of the arrival point when the arrival point has been identified and then transmitting the first positional information PI1 to the navigation system 30. That is, owing to the function of the positional information transmission unit 110*d*, the guidance server control unit 11 acquires the position of the destination point indicated by the destination point information DI and the position of the arrival point, indicated by the specific candidate information associated with the arrival point in the candidate point DB 13*a*, generates the first positional information PI1 that indicates the positions the destination point and the arrival point and then transmits the first positional information PI1 to the navigation system 30. In addition, when the arrival point has not been identified, owing to the function of the positional information transmission unit 110*d*, the guidance server control unit 11 generates second positional information PI2 that indicates the position of the destination point indicated by the destination point information DI and then transmits the second positional information PI2 to the navigation system 30.

Next, the software configuration of the search server 20 will be described. As shown in FIG. 1, the search server control unit 21 executes a search program 210. The search program 210 includes a destination point information transmission unit 210*a*. Owing to the function of the destination point information transmission unit 210*a*, the search server control unit 21 receives the search criterion information CI from the guidance server 10 and then searches for a destination point that matches the search criterion (search keyword) indicated by the search criterion information CI. A destination point DB 23*a* is stored in the search server storage medium 23. The search server control unit 21 consults the destination point DB 23*a* to search for a destination point. In the destination point DB 23*a*, points connected to roads on which a vehicle is allowed to run and points that are not connected to any roads on which a vehicle is allowed to run each are stored in association with at least the position, name, address, telephone number and keyword thereof. The keyword is a string (character) extracted from a description relevant to a point (location) on the Internet (such as a description on a web page describing about a point (location)).

Owing to the function of the destination point information transmission unit 210*a*, the search server control unit 21 finds a point associated with a keyword that matches a single or multiple search keywords (search criteria) as a destination point from the destination point DB 23*a*. Owing to the function of the destination point information transmission unit 210*a*, the search server control unit 21 acquires the position, name, address and telephone number associated with the found destination point from the destination point DB 23*a*, generates the destination point information DI that indicates the position, name, address and telephone number and then transmits the destination point information DI to the guidance server 10. In the present embodiment, the search server 20 is a server managed by a so-called interne search provider, and stores therein the destination point DB 23*a* having a data amount much larger than that of the candidate point DB 13*a*. In the destination point DB 23*a*, a point (location) in the candidate point DB 13*a* is subdivided into some points (locations), and a detailed position is stored for each of the subdivided points.

Next, the software configuration of the navigation system 30 will be described. As shown in FIG. 1, the navigation control unit 31 executes a navigation program 310. The navigation program 310 includes a second search criterion information transmission unit 310*a*, a guidance information generating unit 310*b* and a guidance control unit 310*c*. The second search criterion information transmission unit 310*a* is a module for causing the navigation control unit 31 to execute the function of entering a search criterion from the user and then transmitting the search criterion information CI that indicates the search criterion to the guidance server 10. Owing to the function of the second search criterion information transmission unit 310*a*, the navigation control unit 31 receives a search keyword input as the search criterion from the user via an input device (not shown) and then generates the search criterion information CI that indicates the search criterion.

The guidance information generating unit 310*b* is a module for causing the navigation control unit 31 to execute the function of generating first guidance information GI1 that indicates a first route and the position of the destination point when the arrival point has been identified and generating second guidance information GI2 that indicates a second route and the position of the destination point when the arrival point has not been identified. The first route is a route that connects the current position of the vehicle to the position of the arrival point. The second route is a route that connects the current position of the vehicle to a closest point (closest location). The closet point is a point (location) that is closest to the destination point, among points on roads. That is, owing to the function of the guidance information generating unit 310*b*, the navigation control unit 31 acquires the first positional information PI1 or the second positional information PI2. Then, owing to the function of the guidance information generating unit 310*b*, when the first positional information PI1 that indicates both the position of the destination point and the position of the arrival point has been acquired, the navigation control unit 31 consults map information 33*a* stored in the navigation storage medium 33 to search for the first route using a known route search technique, and generates first guidance information GI1 that indicates the first route and the position of the destination point. In addition, owing to the function of the guidance information generating unit 310*b*, when the second positional information PI2 that indicates only the position of the destination point has been acquired, the navigation control unit 31 consults the map information 33*a* stored in the navigation storage medium 33 to identify the closest point, searches for the second route using a known route search technique and generates second guidance information GI2 that indicates the second route and the position of the destination point. The map information 33*a* includes link data that specify links corresponding to roads and node data that specify nodes indicating connection points of the links. In addition, the current position of the vehicle is identified on the basis of, for example, an output signal from a GPS receiving unit or a vehicle speed sensor (not shown).

The guidance control unit 310*c* is a module for causing the navigation control unit 31 to execute the function of providing guidance for the first route and the position of the destination point on the basis of the first guidance information GI1 and providing guidance for the second route and the position of the destination point on the basis of the second guidance information GI2. That is, owing to the function of the guidance control unit 310*c*, when the first guidance information GI1 has been acquired, the navigation control unit 31 causes a display device (not shown) to display a map on the basis of the map information 33*a* and causes the display device to display the first route and the position of the destination point on the map. In addition, owing to the function of the guidance control unit 310*c*, when the second guidance information GI2 has been acquired, the navigation control unit 31 causes the display device (not shown) to display a map on the basis of the map information 33a and causes the display device to display the second route and the position of the destination point on the map.

With the above configuration, when the destination point is found by the search server 20 and the arrival point associated with the specific candidate point information having a similarity to the destination point information DI on the destination point, higher than or equal to the predetermined reference similarity, has been identified, it is possible to provide guidance for the first route to the arrival point. That is, a candidate point connected to a road is identified as the arrival point, so, owing to the function of the guidance information generating unit 310b, the navigation control unit 31 is able to more reliably obtain the first route to the arrival point and to generate first guidance information GI1 that indicates the first route irrespective of whether the destination point is a point connected to a road.

A candidate point of which candidate point information is stored in the candidate point DB 13a is a point connected to a road, and the road connected to the point is a roadway on which a vehicle is allowed to run. That is, when guidance is provided for a vehicle as in the case of the present embodiment, a candidate point connected to a roadway may be identified as the arrival point such that the vehicle is allowed to arrive at the arrival point. Furthermore, when a vehicle arrives at the arrival point, it is desirable that a parking space is provided at the arrival point. That is, when guidance for a movable body, such as a vehicle, that needs to be parked at an arrival point is provided, guidance is desirably provided by setting a point corresponding to a parking facility as the arrival point. In the present embodiment, a candidate point of which candidate point information is stored in the candidate point DB 13a is a point in a facility suitable for a vehicle to arrive at (parking lot, drop-off area), so it is possible to provide guidance for the first route to the arrival point appropriate for a vehicle to arrive at. On the other hand, when the arrival point has not been identified, owing to the function of the guidance information generating unit 310b, the navigation control unit 31 generates second guidance information GI2 that indicates the second route to the closest point closest to the destination point among points on roads. Thus, even when the arrival point has not been identified, it is possible to reduce a situation that route guidance cannot be provided.

The candidate point associated with the specific candidate point information having the similarity to destination point information DI on the destination point, higher than or equal to a predetermined reference similarity, may be estimated as not a point that corresponds to a facility independent of a facility corresponding to the destination point but a point corresponding to an attached facility of the facility corresponding to the destination point. This is because a candidate point corresponding to an attached facility of a facility corresponding to a destination point is highly likely to be associated with information having a high similarity to information on the destination point. In the present embodiment, owing to the function of the arrival point identifying unit 110c, the navigation control unit 11 identifies the candidate point of which at least one item of the position, name, address and telephone number matches those of the destination point as the arrival point, so the user is able to initially arrive at the arrival point connected to a road and then go to the destination point corresponding to the facility to which the arrival point is attached. Furthermore, the arrival point is a point connected to a road, so even when the destination point is a point that is not connected to a road, it is possible to further reliably arrive at the arrival point and then go to the destination point.

In addition, owing to the function of the guidance information generating unit 310b, when the arrival point has been identified, the navigation control unit 31 generates the first guidance information GI1 that indicates the position of a destination point together with the first route to the arrival point. By so doing, the user is able to recognize the positional relationship between the arrival point and the destination point. In the present embodiment, the destination point DB 23a that is consulted by the search server 20 in order to search for a destination point stores the detail position of the destination point, so the user is able to recognize the detailed positional relationship between the arrival point and the destination point. In addition, by providing guidance for the position of the destination point, the user is able to recognize that guidance for the destination point intended by the user is provided. For example, when guidance for only a route to a parking lot of a destination point, as an arrival point, is provided, the user is able to recognize the position of the arrival point; however, the user may doubt whether the arrival point is the one for going to the destination point intended by the user. In contrast to this, as in the case of the present embodiment, when guidance for the position of the destination point is also provided, the user is able to recognize that guidance for a route to a parking lot for going to the destination point intended by the user is provided.

(2) Destination Point Guidance Process

Figure 2:
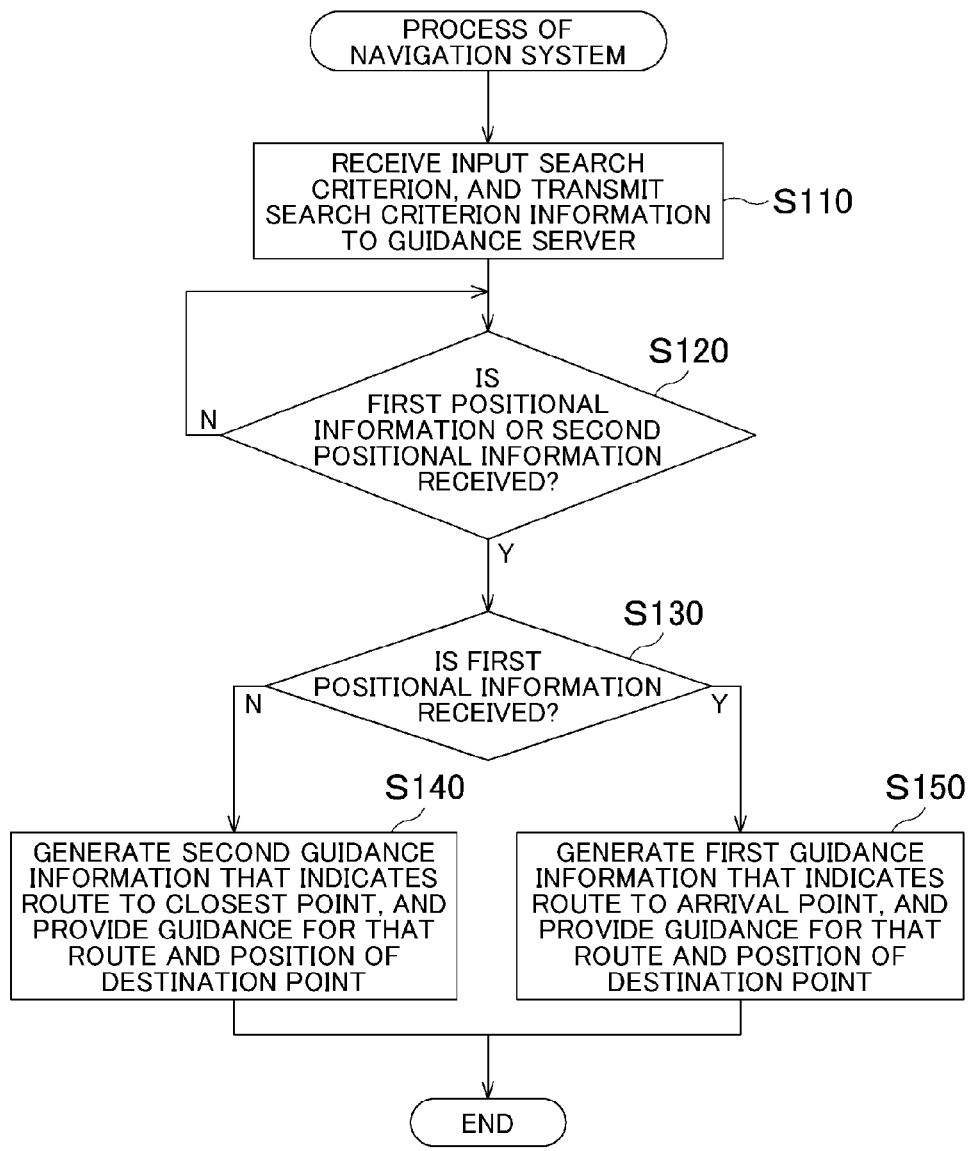
FIG. 2 is a flow charts of destination point guidance process.
Figure 3:
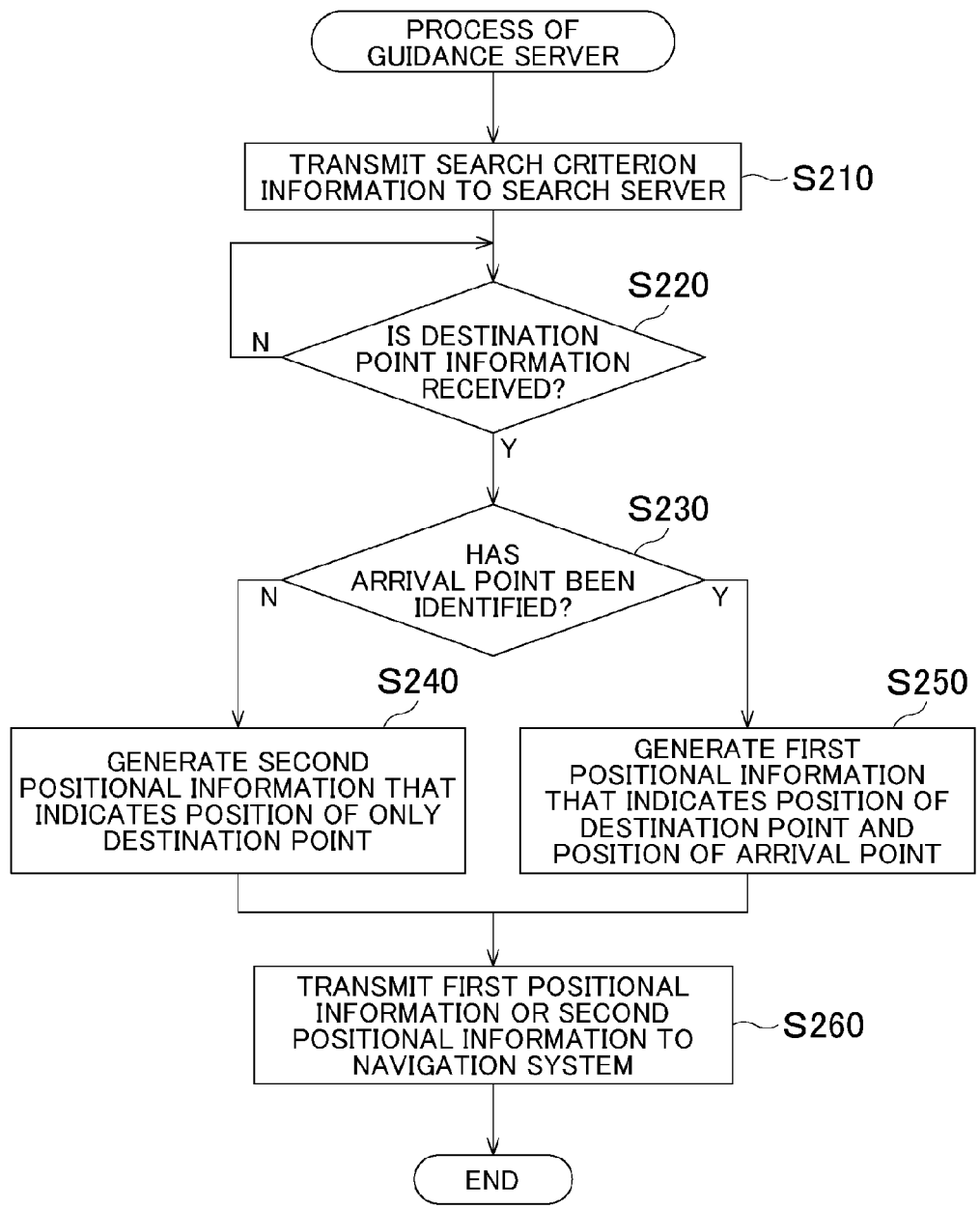
FIG. 3 is a flow charts of destination point guidance process.
Figure 4:
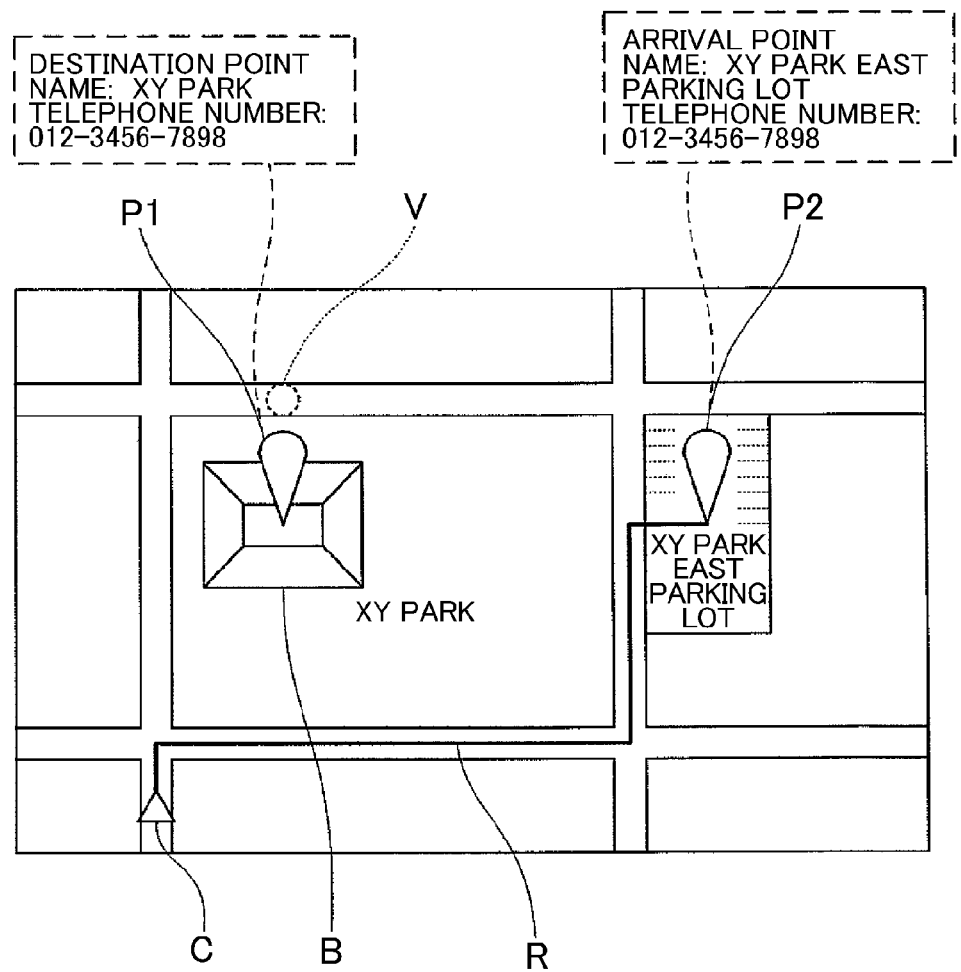
FIG. 4 is a view that shows a destination guidance screen.

FIG. 2 is a flow chart of process executed by the navigation system 30 in the destination point guidance process. FIG. 3 is a flow chart of process executed by the guidance server 10 in the destination point guidance process. First, as shown in FIG. 2, owing to the function of the second search criterion information transmission unit 310a, the navigation control unit 31 receives a search keyword input as a search criterion from the user via an input device (not shown) and then transmits search criterion information CI that indicates the search criterion to the guidance server 10 (S110). Here, the case where the search keyword "XY park" is entered as the search criterion will be described as an example. As the navigation control unit 31 transmits the search criterion information CI, the navigation control unit 31 waits until it receives first positional information PI1 or second positional information PI2 from the guidance server 10 as a response to the search criterion information CI (S120).

The process of the guidance server 10, which is shown in FIG. 3, starts as the guidance server 10 receives the search criterion information CI from the navigation system 30. In a period during which the process of the guidance server 10 is executed, the navigation system 30 waits until it receives the first positional information PI1 or the second positional information PI2 (S120). As the guidance server 10 receives the search criterion information CI from the navigation system 30, the guidance server control unit 11 transmits the search criterion information CI to the search server 20 owing to the function of the first search criterion information transmission unit 110a (S210). Subsequently, owing to the function of the destination point information acquisition unit 110b, the guidance server control unit 11 waits until it receives destination point information DI from the search server 20 as a response to the search criterion information CI (S220).

As the guidance server 10 transmits the search criterion information CI to the search server 20 (S210), the search server control unit 21 searches for a destination point that matches the search criterion indicated by the search criterion information CI owing to the function of the destination point information transmission unit 210a. Owing to the function of the destination point information transmission unit 210*a*, the search server control unit 21 searches the destination point DB 23*a* for a point associated with a keyword that matches the search keyword as the search criterion. As the destination point is found, owing to the function of the destination point information transmission unit 210*a*, the search server control unit 21 generates destination point information DI that at least indicates the name, address, telephone number and position associated with the found destination point, and then transmits the destination point information DI to the guidance server 10. In the present embodiment, owing to the function of the destination point information transmission unit 210*a*, when a plurality of points associated with a keyword that matches the search keyword are found, the search server control unit 21 identifies the point having the highest frequency of selection among the found points as the destination point.

The frequency of selection is obtained in advance through the following statistical processing executed by the search server 20. The search server 20 of the present embodiment is a so-called search provider on the Internet, and provides a map search service in response to a request from a large number of client terminals (PCs, PDAs, cellular phones, and the like) on the Internet. In this map search service, the search server 20 searches the destination point DB 23*a* for a point associated with a keyword that coincides with a search keyword specified from a client terminal. The search server 20 transmits information for displaying a marker, which indicates the position of the found point, on a map to the client terminal. When a plurality of points associated with a keyword that coincides with a search keyword are found, the search server 20 transmits information for displaying makers respectively for these points to the client terminal. Then, as any one of the makers is selected by the client terminal, the search server 20 determines that the point corresponding to the marker is selected and then transmits the URL of the web page associated with the point to the client terminal. The search server 20 statistically calculates the frequency at which a point is selected as the frequency of selection for each search keyword. At a client terminal, the user selects a marker while checking a position on a map, so the frequency of selection of a point increases as the point corresponds to a marker displayed at a highly credible position as a search target position intended by the user or a position that attracts user's attention. Thus, the frequency of selection of a point associated with an inaccurate position is low. In addition, when a search target intended by the user occupies a certain wide area on a map and a plurality of markers are displayed in that area, the frequency of selection of a point increases as the point corresponds to a marker displayed at a symbolic position of the search target.

As the guidance server 10 receives the destination point information DI in S220 of FIG. 3, owing the function of the arrival point identifying unit 110*c*, the guidance server control unit 11 searches for an arrival point and then determines whether the arrival point has been identified (S230). That is, owing to the function of the arrival point identifying unit 110*c*, the guidance server control unit 11 consults the candidate point DB 13*a* to search for a candidate point associated with a specific candidate point information, as the arrival point. At least one of name, address and telephone number of the specific candidate information matches the corresponding one of name, address and telephone number of the destination point. Then, owing to the function of the arrival point identifying unit 110*c*, when no arrival point has been found, the guidance server control unit 11 determines that no arrival point has been identified. On the other hand, owing to the function of the arrival point identifying unit 110*c*, when at least one arrival point has been found, the guidance server control unit 11 determines that an arrival point has been identified.

When it is determined in step S230 that no arrival point has been identified, owing to the function of the positional information transmission unit 110*d*, the guidance server control unit 11 acquires the position of the destination point, indicated by the destination point information DI, and then generates second positional information PI2 that indicates the position of the destination point (S240). On the other hand, when it is determined in step S230 that the arrival point has been identified, owing to the function of the positional information transmission unit 110*d*, the guidance server control unit 11 acquires the position of the destination point, indicated by the destination point information DI, and the position of the arrival point, stored in the candidate point DB, and then generates first positional information PI1 that indicates the positions of the destination point and the arrival point (S250). When a plurality of arrival points have been identified, the first positional information PI1 that indicate the position of the arrival point associated with the specific candidate point information of which the number of information items that match the destination point information DI is the largest and the position of the destination point, indicated by the destination point information DI, is generated. Then, owing to the function of the positional information transmission unit 110*d*, the guidance server control unit 11 transmits the second positional information PI2 generated in step S240 or the first positional information PI1 generated in S250 to the navigation system 30 (S260).

As the navigation system 30 receives the first positional information PI1 in step S120 of FIG. 2 (S130), owing to the function of the guidance information generating unit 310*b*, the navigation control unit 31 consults the map information 33*a* stored in the navigation storage medium 33 to search for a first route and then generate first guidance information GI1 that indicates the first route and the position of the destination. The first route is a route that connects from the current position of the vehicle to the position of the arrival point. Then, owing to the function of the guidance control unit 310*c*, the navigation control unit 31 causes the display device (not shown) to display a map on the basis of the map information 33*a* and causes the display device (not shown) equipped for the vehicle to display the first route and the position of the destination point on the map (S150).

On the other hand, when it is determined in step S230 that no arrival point has been identified, the navigation system 30 receives the second positional information PI2, so the navigation system 30 cannot identify the position of the arrival point. In this case, owing to the function of the guidance information generating unit 310*b*, the navigation control unit 31 consults the map information 33*a* stored in the navigation storage medium 33 to search for a second route and then generates second guidance information GI2 that indicates the second route and the position of the destination point. The second route is a route that connects from the current position of the vehicle to a closest point closest to the destination point among points on roads. Then, owing to the function of the guidance control unit 310*c*, the navigation control unit 31 causes the display device (not shown) to display a map on the basis of the map information 33*a*, and causes the display device (not shown) equipped for the vehicle to display the second and the position of the destination point on the map (S140).

FIG. 3 is a view that shows a map displayed on the display device. The example of FIG. 3 is a map that is displayed when the arrival point has been identified in step S230. The map of FIG. 3 shows a position marker P1 that indicates the position of the destination point, a position marker P2 that indicates the position of the arrival point, a vehicle marker C that indicates the current position of the vehicle and a route indication R that indicates the first route from the current position to the position of the arrival point. In the example of the drawing, the arrival point of which the name is "XY park east parking lot" is identified for the destination point of which the name is "XY park". The telephone numbers of both the destination point and the arrival point coincide with each other.

The "XY park" prohibits entry of a vehicle. Therefore, guidance (search) for a route that is directly connected to the "XY park" cannot be provided (made). In contrast to this, the "XY park east parking lot" is a parking lot, and allows entry of a vehicle from an external road and has a space for parking a vehicle inside. Therefore, the first route connected to the "XY park east parking lot", as the arrival point, can be obtained, and guidance for the first route to the "XY park east parking lot" that is attached to the "XY park" and that allows a vehicle to be parked can be provided.

Furthermore, in the map of FIG. 3, the position marker P1 that indicates the position of the "XY park" is displayed together with the position marker P2 that indicates the position of the "XY park east parking lot", so the user is able to recognize the direction to be directed after parking the vehicle in the "XY park east parking lot" on the basis of the relative positional relationship between the position markers P1 and P2. In addition, when only the position marker P2 that indicates the position of the "XY park east parking lot" is displayed, the user may doubt whether the "XY park" has been found along with user's intention; however, by displaying the position marker P1 that indicates the position of the "XY park" as well, it is possible to recognize that the "XY park east parking lot" should be reached first in order to go to the intended "XY park". Furthermore, the search server 20 sets a point of which the frequency of selection is the highest in the case where the search keyword "XY park" is specified by a client terminal as a destination point, so a point associated with the position recognized by a large number of users as the position of the search target "XY park" is set as the destination point. For example, when a symbolic architecture (corresponding to a mark B on the map of FIG. 3) is present in the "XY park", even when another point is present in the "XY park", the frequency of selection of the point associated with the position of the symbolic architecture becomes the highest. That is, the position marker P1 that indicates the position of the "XY park" is displayed at the position that symbolically indicates the "XY park" in the displayed area of the "XY park" on the map, and the user is able to easily recognize that an intended destination has been found.

On the other hand, when no arrival point has been identified in step S230, owing to the function of the guidance information generating unit 310b, the navigation control unit 31 provides guidance for the second route to the closest point (end-point marker V in FIG. 3) closest to the destination point among points on roads.

(3) Alternative Embodiments

The guidance information generating device according to the aspect of the invention may be a single device, and, for example, the modules 110a to 110d executed by the guidance server 10 may be executed by the navigation system 30. That is, it is applicable that the navigation system 30 directly transmits the search criterion information CI to the search server 20 and then the navigation system 30 identifies the arrival point on the basis of the destination point information DI obtained as a response to the search criterion information CI. In addition, in the above embodiment, it is also applicable that the guidance server 10 generates the first guidance information GI1 that indicates the first route to the arrival point and the second guidance information GI2 that indicates the second route to the closest point closest to the destination point among points on roads, and transmits the first and second guidance information GI1, GI2 to the navigation system 30. In addition, owing to the function of the arrival point identifying unit 110c, the guidance server control unit 11 identifies an arrival point that is connected to a roadway in order to provide guidance for the vehicle; instead, the guidance server control unit 11 may provide guidance for an arrival point that is connected to a sidewalk in order to provide guidance for a pedestrian.

In the above embodiment, owing to the function of the arrival point identifying unit 110c, the guidance server control unit 11 determines that the similarity between the destination point information DI and the candidate point information is higher than or equal to a predetermined reference similarity when the number of information items, such as name and telephone number, of the candidate point indicated by the candidate point information that match the corresponding information items of the destination point indicated by the destination point information DI is larger than or equal to one; instead, the guidance server control unit 11 may determine that the similarity between the destination point information DI and the candidate point information is higher than or equal to the predetermined reference similarity when the number of matched information items is larger than or equal to a predetermined multiple number. Furthermore, it is also applicable that the guidance server control unit 11 may determine that the similarity between the destination point information DI and the candidate point information is higher than or equal to the predetermined reference similarity when the percentage of matched information items is higher than or equal to a predetermined percentage. In addition, the case where information items, such as names, match each other may include not only the case where the character codes of characters corresponding to the information items match each other but also the case where the character codes are different but the meanings of the characters are substantially synonymous with each other. For example, it may be regarded that an uppercase letter and the corresponding lower case letter match each other (i.e., with case ignored). In addition, it may be regarded that a letter in hiragana and the corresponding letter in katakana match each other, or may be regarded that a letter in kanji and a letter in hiragana match each other when the letters may be converted to each other.

Owing to the function of the guidance information generating unit 310b, the navigation control unit 31 may generate the first guidance information GI1 that indicates only the first route to the arrival point and may not necessarily generate the first guidance information GI1 that indicates both the first route and the destination point. This is because, as long as the user may be guided to near the arrival point, the user is able to recognize the destination point by user's actual sight even without guidance for the position of the destination point. Similarly, the navigation control unit 31 may generate the second guidance information GI2 that indicates only the second route to the closest point closest to the destination point among points on roads and may not necessarily generate the second guidance information GI2 that indicates both the second route and the destination point. In addition, owing to the function of the guidance information generating unit 310b, the navigation control unit 31 may generate the first guidance information GI1 that provides guidance for the first route to the arrival point by voice and the second guidance information GI2 that provides guidance for the closest point closest to the destination point among points on roads by voice.

The above described technique for providing guidance for the first route to the arrival point identified on the basis of the destination point information may be applied as a method and a program that execute the above processing. In addition, the guidance information generating device, guidance information generating method and guidance information generating program that employ the technique of the aspect of the invention may be implemented as a single device or may be implemented as a plurality of devices. In addition, the configuration may be modified where appropriate. For example, part of the guidance information generating device, guidance information generating method and guidance information generating program that employ the technique of the aspect of the invention is implemented by software and the remaining part is implemented by hardware. Furthermore, the guidance information generating device, guidance information generating method and guidance information generating program that employ the technique of the aspect of the invention may be implemented by a storage medium storing a program for controlling the guidance information generating device. Of course, the storage medium storing software may be a magnetic storage medium or may be a magnetooptical storage medium, and any storage media that will be developed in the future may also be used similarly.

The invention claimed is:

1. A guidance information generating device characterized by comprising:
 a search criterion information transmission unit that transmits search criterion information, which indicates a search criterion, to a search server (20) that is a search provider on Internet;
 a destination point information acquisition unit that acquires destination point information on a destination point including information indicating a position of the destination point, name of the destination point, address of the destination point and telephone number of the destination point, which is a point searched in a destination point database stored in the search server on the basis of the search criterion and which is searched among points including points not connected to a road, from the search server;
 an arrival point identifying unit that searches a candidate point database stored in the guidance information generating device that stores candidate point information on a candidate point connected to the road in association with the candidate point, and that identifies the candidate point associated with the candidate point information including at least one of name of the candidate point matching to the name of the destination point and telephone number of the candidate point matching to the telephone number of the destination point, as an arrival point; and
 a guidance information generating unit that generates first guidance information that indicates a first route to the arrival point when the arrival point has been identified and that generates second guidance information that indicates a second route to a point closest to the destination point among points on roads when the arrival point has not been identified;
 wherein the guidance information generating unit generates the first guidance information that causes a display device to display the first route and a position of the destination point when the arrival point has been identified.

2. The guidance information generating device according to claim 1, wherein the guidance information generating unit generates the second guidance information that indicates the second route and a position of the destination point when the arrival point has not been identified.

3. The guidance information generating device according to claim 1, wherein the candidate point is a point corresponding to a facility in which a parking space is provided.

4. A guidance information generating method for a guidance information generating device, comprising:
 transmitting search criterion information, which indicates a search criterion, to a search server that is a search provider on Internet;
 acquiring destination point information on a destination point including information indicating a position of the destination point, name of the destination point, address of the destination point and telephone number of the destination point, which is a point searched in a destination point database stored in the search server on the basis of the search criterion and which is searched among points including points not connected to a road, from the search server;
 searching a candidate point database stored in the guidance information generating device that stores candidate point information on a candidate point connected to the road in association with the candidate point, and identifying the candidate point, associated with the candidate point information including at least one of name of the candidate point matching to the name of the destination point and telephone number of the candidate point matching to the telephone number of the destination point, as an arrival point; and
 generating first guidance information that indicates a first route to the arrival point when the arrival point has been identified and generating second guidance information that indicates a second route to a point closest to the destination point among points on roads when the arrival point has not been identified;
 in case each of the candidate point information and the destination point information indicates information on a plurality of information items, and
 generating the first guidance information that causes a display device to display the first route and a position of the destination point when the arrival point has been identified.

5. A non-transitory computer-readable storage medium storing a guidance information generating program that causes a computer to perform a guidance information generating function for a guidance information generating device, the guidance information generating function comprising:
 transmitting search criterion information, which indicates a search criterion, to a search server that is a search provider on Internet;
 acquiring destination point information on a destination point including information indicating a position of the destination point, name of the destination point, address of the destination point and telephone number of the destination point, which is a point searched in a destination point database stored in the search server on the basis of the search criterion and which is searched among points including points not connected to a road, from the search server;
 searching a candidate point database stored in the guidance information generating device that stores candidate point information on a candidate point connected to the road in association with the candidate point, and identifying the candidate point, associated with the candidate point information including at least one of name of the candidate point matching to the name of the destination point and telephone number of the candidate point matching to the telephone number of the destination point, as an arrival point; and generating first guidance information that indicates a first route to the arrival point when the arrival point has been identified and generating second guidance information that indicates a second route to a point closest to the destination point among points on roads when the arrival point has not been identified, in case each of the candidate point information and the destination point information indicates information on a plurality of information items, generating the first guidance information that causes a display device to display the first route and a position of the destination point when the arrival point has been identified.

6. The guidance information generating device according to claim 2, wherein the candidate point is a point corresponding to a facility in which a parking space is provided.

\* \* \* \* \*